United States Patent Office 3,635,947
Patented Jan. 18, 1972

3,635,947
CATALYTIC PROCESS FOR THE PREPARATION OF MONOCARBODIIMIDES AND ISOCYANATE-MONOCARBODIIMIDE ADDUCTS
Ehrenfried H. Kober, Hamden, Wilhelm J. Schnabel, Branford, and Strong K. Gardner, North Haven, Conn., assignors to Olin Mathieson Chemical Corporation
No Drawing. Filed Jan. 10, 1967, Ser. No. 608,456
Int. Cl. C07c *119/04;* C07d *44/00*
U.S. Cl. 260—239 A                  8 Claims

ABSTRACT OF THE DISCLOSURE

Monocarbodiimides and organic isocyanate-monocarbodiimide adducts are provided by heating organic isocyanates in the presence of a catalytic amount of phenylphosphonic diamide at a temperature from about 120° to about 190° C. The monocarbodiimides are useful as catalysts and chemical intermediates; the adducts are useful in the preparation of polyurethane foams.

---

This invention relates to a process for the preparation of monocarbodiimides, organic isocyanate-monocarbodiimide adducts, and mixtures of organic isocyanates and organic isocyanate-monocarbodiimide adducts. More specifically, this invention relates to a catalytic process for preparing the aforementioned products from organic isocyanates.

The preparation of monocarbodiimides and polycarbodiimides from monoisocyanates and polyisocyanates respectively in the presence of various catalysts has been previously described in the literature. For example, J. J. Monagle in J. Org. Chem. 27, 3851–3855 (1962) reports the results of a study of the catalytic effect of various phosphorus-containing compounds in the conversion of monoisocyanates to monocarbodiimides. The cyclic phosphine oxides were reported to be the most active of the catalysts studied, whereas long reaction times and variations in yield were observed with certain phosphoramides, phosphoramidates, phosphonates and phosphates.

However, cyclic phosphine oxides are costly and difficult to synthesize, thereby discouraging their utilization in commercial processes. Furthermore, reactions employing the cyclic phosphine oxides proceed very rapidly and are difficult to control. Thus, when organic polyisocyanates are employed as the starting material, high molecular weight polycarbodiimides are generally obtained, as reported by Campbell, T. W. et al. in J. Org. Chem. 28, 2069–2075 (1963). The preparation of isocyanate-terminated monocarbodiimides from organic polyisocyanates utilizing cyclic phosphine oxide catalysts is difficult, requiring the utilization of auxiliary solvents and complicated separation techniques to isolate the monocarbodiimide from the reaction mixture.

U.S. Pat. 3,152,162 which issued Oct. 6, 1964 to Peter Fischer et al., discloses the preparation of polyisocyanates of the diphenyl methane series which contain carbodiimide-isocyanate adducts by heating the appropriate polyisocyanate to a temperature of about 150°–300° C. and subsequently cooling the reaction mass. No catalyst is employed, and the examples indicate that both relatively high temperatures, i.e., 189° C. and higher, and long reaction times are required to obtain the carbodiimide in relatively low yield. For example, after heating for 4½ hours, only 6 percent of the isocyanate was converted to carbodiimide.

Now it has been found that monocarbodiimides, organic isocyanate-monocarbodiimide adducts, and mixtures of organic isocyanates and organic isocyanate-monocarbodiimide adducts can be provided in high yield and excellent purity under mild reaction conditions by heating an organic isocyanate in the presence of a catalytic proportion of phenylphosphonic diamide.

According to one embodiment of this invention, an organic isocyanate is heated in the presence of the aforementioned catalyst to provide a monocarbodiimide in accordance with the following equation:

$$2\text{R}-(\text{NCO})_x \longrightarrow (\text{NCO})_{x-1}-\text{R}-\text{N}=\text{C}=\text{N}-\text{R}-(\text{NCO})_{x-1} + \text{CO}_2$$
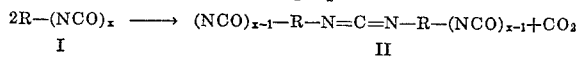
I                                II wherein R is as described below and x is an integer from 1 to 4. To obtain the desired monocarbodiimide II, the reaction mixture is heated until all the isocyanate has been converted to monocarbodiimide, or, the isocyanate is removed from the reaction mixture by any conventional technique, such as distillation, prior to completion of the reaction, leaving behind the monocarbodiimide.

In another embodiment of this invention, the heating of the previously-described reaction mixture is terminated prior to complete conversion to the monocarbodiimide and the reaction mixture cooled, thereby allowing the unreacted isocyanate to react with the monocarbodiimide II to provide an isocyanate-monocarbodiimide adduct having the following general formula:

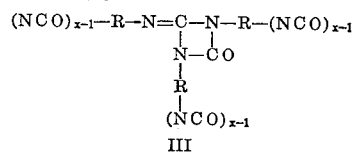

III wherein R is as described below and x is as previously described.

The reaction can be easily controlled by heating until a calculated amount of carbon dioxide evolves which represents a predetermined conversion of isocyanate to monocarbodiimide, thereby providing upon cooling, either adduct III or a mixture of adduct III and unrecated isocyanate, the mixture having a predetermined isocyanate functionality. The desired products are obtained in high purity, with very small amounts, if any, of other low molecular weight materials being formed in the process. Furthermore, the reaction is characterized by providing isocyanate-monocarbodiimide adducts and mixtures of isocyanates and monocarbodiimide adducts under milder conditions than would be necessary without a catalyst, and without the formation of high molecular weight polycarbodiimides.

While temperatures from about 120°–190° C. can be employed in the process of this invention, preferred embodiments utilize temperatures in the range of about 150° to 185° C. Pressure is not a critical feature of this invention.

Phenylphosphonic diamide is readily and economically provided by reacting phenylphosphonic dichloride with liquid ammonia. It is generally employed in an amount from about 0.1 to 5.0 mole percent based on the isocyanate, with an amount between about 0.5 to 2.5 mole percent being preferred. However, amounts as small as 0.05 and even less can be effectively utilized. Greater amounts can also be used, but no added catalytic effect is realized at higher concentrations.

The organic isocyanate employed in the process of this invention is represented by the Formula I above wherein R is an aromatic alkyl, aryl-alkyl or cycloaliphatic radical and x is an integer from 1 to 4. However, preferred embodiments utilize those isocyanates where R is a cycloaliphatic radical having from 5 to 7 ring carbon atoms, e.g., cyclohexyl isocyanate, or an aromatic radical having from 6 to 10 ring carbon atoms, e.g., phenyl isocyanate, toluene diisocyanates and the like. In the preparation of the organic isocyanate-monocarbodiimide adducts III, it is particularly preferred to employ polyfunctional isocyanates, for example, isocyanates represented by the Formula I wherein R is a polyvalent aromatic radical and $x$ is an integer from 2 to 4. Exemplification of these aromatic isocyanates preferred in the preparation of adducts III are the aromatic di-, tri-, and tetraisocyanates having from 6 to 10 ring carbon atoms and including those containing hydrocarbon substituents on nuclear ring carbon atoms. Typical isocyanates include 2,4-toluene diisocyanate, 4-isopropyl - 1,3-phenylene diisocyanate, p-xylene-2,5-diisocyanate, 1,5-naphthalene diisocyanate, isomers thereof and the like. Where a particular isocyanate is named in the claims and specification herein, it is to be understood that any isomer of the isocyanate, or mixture of isomers, is included.

Thus, in summary, the catalytic process of this invention provides a variety of products in high purity and under mild condditions, obviating the necessity of employing solvents and costly separation and purification techniques. Furthermore, high yields of monocarbodiimide are obtained utilizing small quantities of phenylphosphonic diamide. For instance, phenylcarbodiimide was obtained in 98 percent yield by heating phenylisocyanate for 14 hours in the presence of 4 mole percent of diethyl phosphordiamide, whereas the previously described Monagle article reported that heating phenyl isocyanate for 19 hours in the presence of 3 mole percent of diethyl phosphoramidate yielded, at best, 77.6 percent phenylcarbodiimide.

The products provided by the process of this invention have a wide variety of useful applications. For example, monocarbodiimides are useful as catalysts for converting alcohols and acids to esters, for converting acids and amines to amides such as polypetides and as intermediates for preparing isourea ethers, guanidines, ureas, polyurethanes and the like. The isocyanate-monocarbodiimide adducts III and mixtures of isocyanates and these adducts wherein the adducts contain free isocyanate groups are particularly useful in the preparation of polyurethanes. These adducts are obtained by employing the preferred polyvalent aromatic isocyanates in the previously-described process. Thus, these adducts are reacted with organic compounds containing active hydrogen containing groups, such as polyhydroxy polyethers, in the presence of a catalyst and foaming agent to provide rigid polyurethane foams having excellent physical properties. Furthermore, these mixtures are extremely stable, and can be stored indefinitely prior to use.

The following examples will serve to illustrate the preparation of various monocarbodiimides and mixtures of organic isocyanates and organic isocyanate-monocarbodiimide adducts in accordance with the process of this invention.

EXAMPLE I

A five liter 3-necked flask equipped with a thermometer, a reflux condenser fitted with a wet-test meter, and a blade stirrer, was charged with 2,459 grams (14.1 moles) of toluene diisocyanate comprising 80 percent of the 2,4-isomer and 20 percent of the 2,6-isomer, and 11.0 grams (0.07 mole–0.5 mole percent) of phenylphosphonic diamide. The mixture was heated with stirring at 180° C. until the wet-test meter revealed that 35.4 liters (1.5 moles) of carbon dioxide, identified by the formation of a precipitate with barium hydroxide, had evolved. This was the amount calculated to provide a final product having an average functionality of about 2.3; the reaction time was four hours. After cooling to room temperature, 2,401 grams of a viscous liquid were obtained. The weight loss, together with the recorded moles of carbon dioxide evolved, revealed that a mixture comprising toluene diisocyanate and 477.1 grams of carbodiimide had been obtained. Gel permeation chromatography indicated that the carbodiimide consisted essentially of an isomeric mixture of the monocarbodiimide with traces of the dicarbodiimide. Thus, 22.2 percent of the toluene diisocyanate had been converted to low molecular weight carbodiimides.

Infra red analysis showed a characteristic carbodiimide band at 4.65μ. Comparison of the infrared absorption peak of a 2 percent solution of the reaction mixture in o-dichlorobenzene with the calibration curve obtained with pure diphenylcarbodiimide solution revealed that the product contained 2.8 percent by weight —N=C=N—, corresponding to the calculated amount of 2.6 percent.

After standing at room temperature overnight, infrared analysis of the resulting product revealed an absence of the carbodiimide band and the presence of strong carbonyl absorption at 5.8μ, thus showing the presence of a trifunctional isocyanate adduct having the following formula:

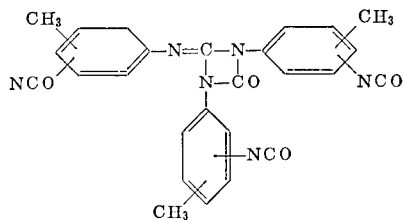

EXAMPLE II

Phenyl isocyanate (59.5 grams) was charged to a three-neck flask equipped as in Example I, and heated under a blanket of nitrogen to an oil bath temperature in the range of 170°–180° C. Phenylphosphonic diamide (1.4 grams, 2 mole percent) was added to the phenyl isocyanate and the system heated gently at reflux. After 30 minutes, a sample was withdrawn and analyzed by infrared spectroscopy, which revealed the presence of the carbodiimide band at 4.65μ. After a total heating period of 14 hours, the oil bath was removed and the reaction product cooled by means of an ice bath. Vacuum distillation of the product provided a 2 percent recovery of phenylisocyanate, revealing a 98 percent yield of phenylcarbodiimide. Infrared spectroscopy confirmed the structure of the product.

For purposes of comparison, Example II was repeated omitting the phenylphosphonic diamide. After refluxing the phenylisocyanate for 7 hours, the flask was cooled. Vacuum distillation provided 100 percent recovery of the isocyanate showing that no carbodiimide had been formed.

EXAMPLE III

Following the procedure of Example I, 62.5 grams of cyclohexylisocyanate were heated at 170°–180° C. for 4 hours in the presence of 2.8 grams of phenylphosphonic diamide (4 mole percent). Quantitative infrared analysis revealed a 50 percent conversion of the isocyanate to dicyclohexylcarbodiimide, which was isolated by distillation, boiling point 140°–142° C./8.0 mm. Hg. A very small amount of a product of similar structure having a slightly higher molecular weight was also obtained. Gel permeation chromatography confirmed that the product consisted essentially of these low molecular weight adducts. Calculations based on the amount of carbodiimide formed initially revealed that the reaction product comprised 31.2 percent by weight of the above-described low molecular weight isocyanate adducts and 68.8 percent by weight toluene diisocyanate, and had the predetermined average NCO functionality of approximately 2.31. Titration of a sample of the mixture with dibutylamine revealed an NCO content of 41.3 percent by weight, corresponding to the calculated value of 41.4 percent. The reaction product had a viscosity of 15.0 cps. at 25° C. and a freezing point of —14° C.

For purposes of comparison, toluene disisocyanate was heated for four hours at a temperature of 180° C. in the absence of a catalyst. Distillation of the reaction mixture provided a nearly quantitative recovery of the toluene diisocyanate. Again, Example I was repeated employing 2 mole percent of triethyl phosphate as a catalyst. After heating at 180° C. for 2 hours, only 3.2 percent of the toluene diisocyanate had been converted to carbodiimides.

We claim:

1. A process for preparing monocarbodiimides which comprises heating an organic isocyanate in the presence of a catalytic amount of phenylphosphonic diamide at a temperature from about 120° to about 190° C., said inorganic isocyanate having the formula $$R\text{---}(NCO)_x$$

wherein R is selected from the group consisting of an aromatic, alkyl, aryl-alkyl, and cycloaliphatic radical, and $x$ is an integer from 1 to 4.

2. The process of claim 1 in which said organic isocyanate is selected from the group consisting of aromatic isocyanates and cycloaliphatic isocyanates.

3. The process of claim 2 in which said organic isocyanate is toluene diisocyanate.

4. The process of claim 2 in which said organic isocyanate is phenyl isocyanate.

5. The process of claim 2 in which said organic isocyanate is cyclohexyl isocyanate.

6. A process for preparing organic isocyanate-monocarbodiimide adducts containing free isocyanate groups which comprise heating an organic isocyanate in the presence of a catalytic amount of phenylphosphonic diamide at a temperature between about 120° and about 190° C. until part of said isocyanate has been converted to the monocarbodiimide and then cooling the reaction mixture, said organic isocyanate having the formula $$R\text{---}(NCO)_x$$

wherein R is selected from the group consisting of an aromatic, alkyl, aryl-alkyl, and cycloaliphatic radical, and $x$ is an integer from 1 to 4.

7. The process of claim 6 in which said organic isocyanate is an aromatic isocyanate.

8. The process of claim 7 in which said organic isocyanate is toluene diisocyanate.

References Cited

UNITED STATES PATENTS 3,152,162  10/1964  Fischer et al. _____ 260—566

OTHER REFERENCES

Monagle, J. Org. Chem., vol. 27, pp. 3851–3855, (1962).

ALTON D. ROLLINS, Primary Examiner

U.S. Cl. X.R.

260—453 A, 453 AR, 453 AL, 551